United States Patent
Jutla et al.

(10) Patent No.: US 8,681,986 B2
(45) Date of Patent: Mar. 25, 2014

(54) SINGLE-ROUND PASSWORD-BASED KEY EXCHANGE PROTOCOLS

(75) Inventors: Charanjit Singh Jutla, Elmsford, NY (US); Arnab Roy, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 260 days.

(21) Appl. No.: 13/115,720

(22) Filed: May 25, 2011

(65) Prior Publication Data
US 2012/0300930 A1 Nov. 29, 2012

(51) Int. Cl.
*H04L 9/00* (2006.01)
*G06F 9/00* (2006.01)

(52) U.S. Cl.
USPC .............................. 380/262; 713/2

(58) Field of Classification Search
None
See application file for complete search history.

(56) References Cited

U.S. PATENT DOCUMENTS

| | | | | |
|---|---|---|---|---|
| 6,084,968 | A * | 7/2000 | Kennedy et al. | 380/259 |
| 6,128,724 | A * | 10/2000 | Lee et al. | 712/32 |
| 6,693,964 | B1 | 2/2004 | Zhang et al. | 375/240.16 |
| 6,925,568 | B1 * | 8/2005 | Heinonen | 713/193 |
| 7,139,917 | B2 * | 11/2006 | Jablon | 713/183 |
| 8,553,878 | B2 * | 10/2013 | Farrugia et al. | 380/28 |
| 2002/0067832 | A1 * | 6/2002 | Jablon | 380/277 |
| 2002/0099766 | A1 * | 7/2002 | Tuli | 709/203 |
| 2002/0136410 | A1 * | 9/2002 | Hanna | 380/277 |
| 2003/0158960 | A1 | 8/2003 | Engberg | |
| 2004/0223619 | A1 | 11/2004 | Jablon | |
| 2005/0008152 | A1 * | 1/2005 | MacKenzie | 380/44 |
| 2005/0050328 | A1 | 3/2005 | Mizrah | |
| 2007/0043946 | A1 | 2/2007 | Lauter et al. | |
| 2008/0046740 | A1 | 2/2008 | Narayanana et al. | |
| 2009/0288143 | A1 | 11/2009 | Stebila et al. | |
| 2010/0205443 | A1 | 8/2010 | Zhao et al. | |
| 2010/0306542 | A1 | 12/2010 | Funk | |

OTHER PUBLICATIONS

Jonathan Katz, et al., "One-Round Password-Based Authenticated Key Exchange," published in the Cryptology ePrint Archive (http://eprint.iacr.org/), Jun. 2010.*
International Search Report Dated Oct. 26, 2012 for related PCT Application Serial No. PCT/US12/36296 filed May 3, 2012.
Danny Dolev, et al., "Non-Malleable Cryptography," LNCS Dolev is published in SIAM J. Comput., vol. 30, No. 2, pp. 391-437 Jun. 3, 2000.
Rosario Gennaro et al., "A Framework for Password-Based Authenticated Key Exchange," Gennaro et al. Cryptology—Eurocrypt May 2003.

* cited by examiner

*Primary Examiner* — Cordelia Zecher
*Assistant Examiner* — Trang Doan
(74) *Attorney, Agent, or Firm* — F. Chau & Associates, LLC; Anne V. Dougherty, Esq.

(57) ABSTRACT

A method for initializing encrypted communications using a common reference string and a shared password, includes determining a secret key of a peer using a first message, a second message and the common reference string, wherein the first message and the second message each comprise a tuple of elements of a cyclic group G of prime order p, a blinding encryption of the shared password, and a hash projection key.

19 Claims, 5 Drawing Sheets

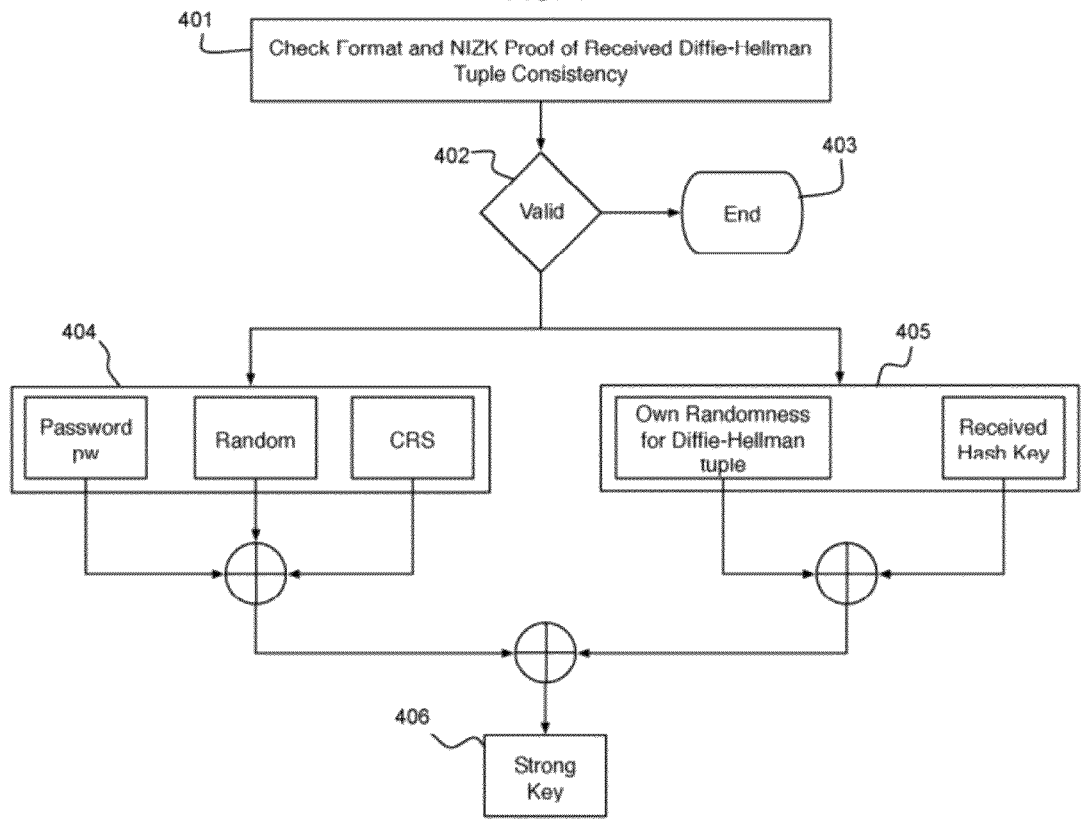
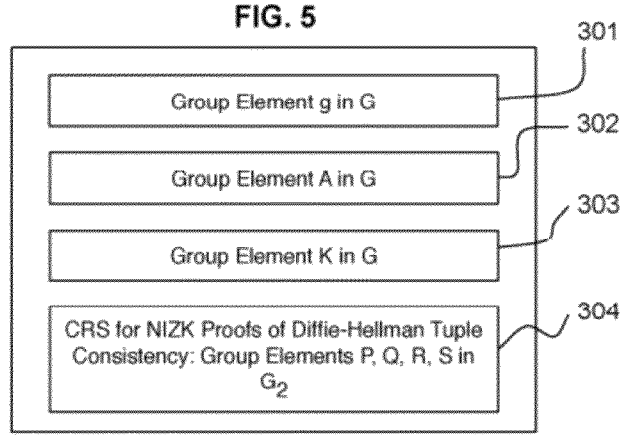

SINGLE-ROUND PASSWORD-BASED KEY EXCHANGE PROTOCOLS

This invention was made with Government support under Contract No.: FA8750-08-2-0091 awarded by Department of Interior. The Government has certain rights in this invention.

BACKGROUND

1. Technical Field

The present application relates to secure communications and more particularly to single-round password-based key exchange enabling secure communications.

2. Discussion of Related Art

Authentication based on passwords is a significant security paradigm. Security in this scenario is a challenging problem because passwords typically come from low-entropy domains having insufficient randomness to generate cryptographically secure keys.

Models in which passwords are shared by peers have been developed in order to secure communications from attacks. All current password-based key exchange protocols follow a non-malleable commitment paradigm, e.g., the chosen ciphertext adversary model CCA2-encryption paradigm, along with related hash proof systems. These protocols also employ smooth projective hash functions similar to those in the CCA2 encryption schemes. Here, methods for obtaining hash proofs typically include multiple rounds of exchange between the peers along with simulation sound zero knowledge proofs.

BRIEF SUMMARY

According to an exemplary embodiment of the present disclosure, a method includes determining a generalized Diffie-Hellman tuple, generating a one-time simulation-sound zero-knowledge proof proving the consistency of the generalized Diffie-Hellman tuple, and encrypting a message according to the generalized Diffie-Hellman tuple.

According to an exemplary embodiment of the present disclosure, a method for conducting encrypted communication using a common reference string and a shared password includes determining a secret key using a first message sent to a peer, a second message received from the peer and the common reference string, wherein the first message and the second message each comprise a tuple of elements of a cyclic group G of prime order p, a blinding encryption of the shared password, and a hash projection key.

According to an exemplary embodiment of the present disclosure, a method for initializing secure communications using a common reference string and a shared password, includes determining a secret key of a peer using a first message, a second message and the common reference string, wherein the first message and the second message each comprise a tuple of elements of a cyclic group G of prime order p, a blinding encryption of the shared password, and a hash projection key.

According to an exemplary embodiment of the present disclosure, a method for initializing secure communications using a common reference string and a shared password, includes sending a first message to a peer, receiving a second message from the peer, and determining a secret key of the peer using the first message, the second message and the common reference string, where in the first message and the second message each comprise a generalized Diffie-Hellman tuple, a blinding encryption of the shared password, a hash projection key, and a one-time simulation-sound zero-knowledge proof proving consistency of the generalized Diffie-Hellman tuple.

BRIEF DESCRIPTION OF THE SEVERAL VIEWS OF THE DRAWINGS

Preferred embodiments of the present disclosure will be described below in more detail, with reference to the accompanying drawings:

FIG. 4 is a flow diagram for an exemplary method of generating a shared key according to an embodiment of the present disclosure;

FIG. 5 is a diagram of a Common Reference String according to an embodiment of the present disclosure;

DETAILED DESCRIPTION

Figure 1:
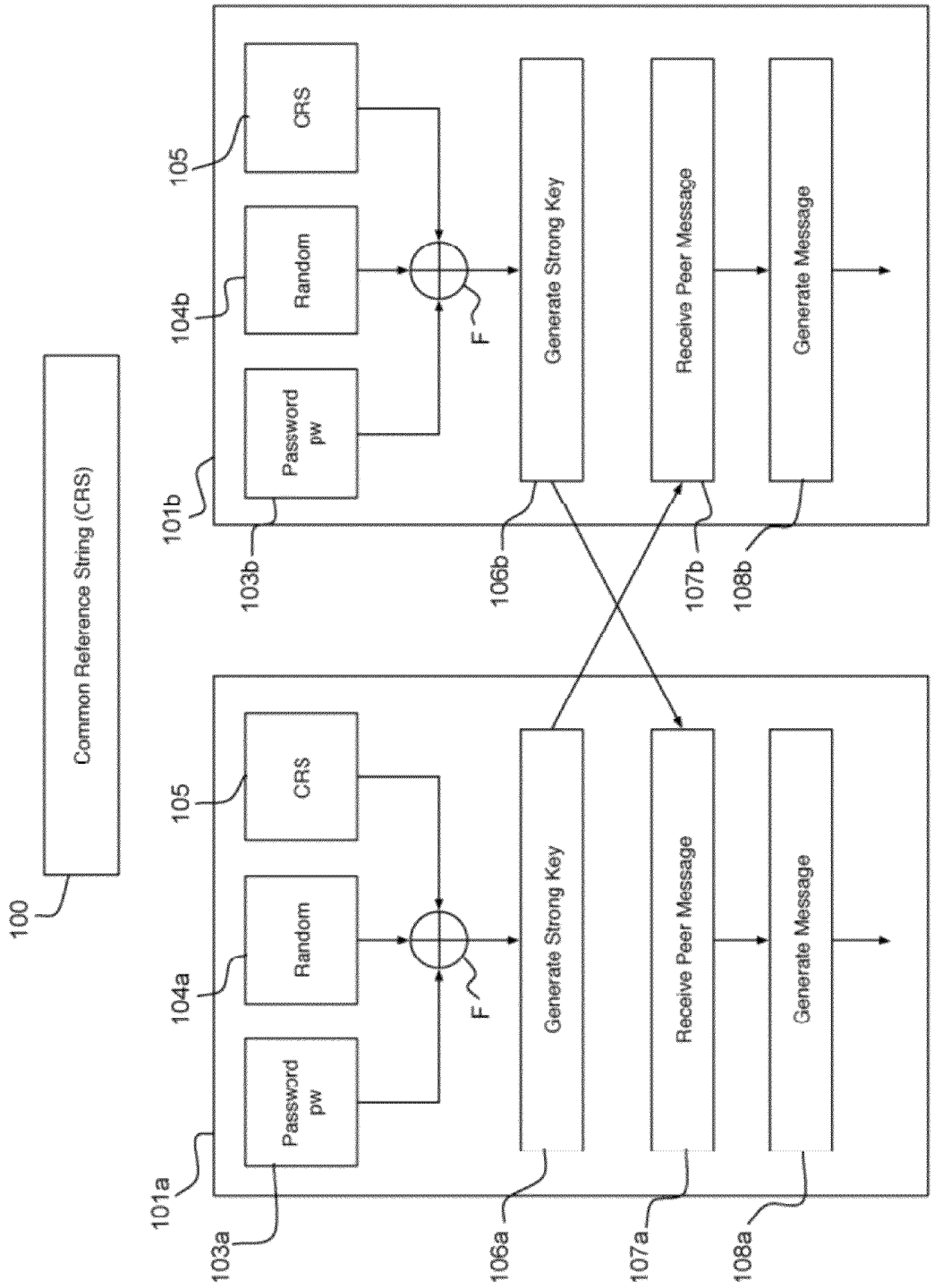
FIG. 1 is a diagram of a protocol for a password based key exchange according to an embodiment of the present disclosure.

According to an embodiment of the present disclosure, a single-round password-based key exchange enables secure communications. The single-round password-based key exchange may be used for different models of secure communications. For example, the single-round password-based key exchange may be used in a Password-Authentication Key (PAK) security model or a Universally Composable (UC) model. The single-round password-based key exchange bypasses the non-malleable commitment paradigm on which traditional password-based key exchange protocols have been built. By avoiding the non-malleable commitment paradigm of the CCA-2 encryption paradigm, methods may be made efficient with respect to both communication cost and computation of a final key.

According to an embodiment of the present disclosure, hash proof systems may be implemented and incorporated in the password-based key exchange protocol. More particularly, a shared secret key may be determined as product of two projective hash functions, a first projective hash function corresponding to a language associated with valid encryptions of password, and a second projective hash function corresponding to the integrity of ciphertexts in the encryption scheme. The second projective hash function need not be the universal-2 projective hash function used in CCA2 encryption schemes. To prove security based only on a decisional Diffie-Hellman (DDH) assumption, a further (pairwise-independent) redundancy is needed in a common reference string trapdoor.

The single-round password-based key exchange is efficient, wherein NIZK (Simulation-Sound Non-Interactive Zero-Knowledge) is used for the proof of knowledge of secret hash keys and not necessarily for construction of CCA2 secure encryption. The single-round password-based key exchange uses a multi-theorem NIZK proof system. The single-round password-based key exchange may use multi-theorem NIZK proof systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the faun disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

According to an embodiment of the present disclosure, a hash proof system is used, wherein peers share a password. If the password shared is wrong, the peers will derive unrelated secret keys. Further, an eves-dropper, whether passive or active, has no advantage in guessing the final key agreed on by the legitimate peers, up to the extent that the password may have been weak to start with. For example, for a password that is 4 decimal digits long, the eves-dropper may guess the password with probability 1 in 9999 in a single try, which is the same as a random guess. That is, the eves-dropper has no additional advantage over a random guess.

According to an embodiment of the present disclosure, the common reference string (CRS) is a globally published random value, which is accessible to all peers, e.g., the last digit of Dow Jones Average (DJIA) on any particular day. Another example is a random string published by an organization such as NIST (the National Institute of Standards Technology).

Referring to FIG. 1, given two peers A and B, 101*a* and 101*b*, and independent random values the peers have chosen as r_A and r_B (104*a* and 104*b*), then using these random values both peer A and peer B may determine a function F of their respective random value, the common CRS 105 and their password (103*a* and 103*b*). The function F may be specified by the protocol. The resulting value (106*a* and 106*b*) is sent to the other peer. Both peers, on receiving the respective values from the other peer at blocks 107*a* and 107*b*, then determine a final key based on what they received from the other peer, their password, the CRS, and their random value in order to generate a respective message (108*a* and 108*b*).

The two peers will determine the same key if, and only if, they used the same password (103*a* and 103*b*). Moreover, if the passwords were different, even in one bit, the two values will be random and independent of one another. The same holds, if a third party (e.g., a "man in the middle") with incorrect knowledge of the password tries to launch an active or a passive eves-dropping attack; that is, the value generated will be random and independent of values obtained by the peers.

In the specification and the drawings, cyclic groups G1 and G2, both of prime order p, are used such that they satisfy the SXDH (Symmetric External Diffie-Hellman) assumption.

The SXDH assumption includes an underlying algebraic structure using two different cyclic groups G1 and G2, each of prime order p. A bilinear map takes a pair of elements from G1 and G2 respectively and maps them to a third group called the target Group G3. The SXDH assumption states that the two groups G1 and G2 are so incompatible that the Diffie-Hellman assumption holds in both of these groups individually. Thus, given a generator g of the cyclic group G1, and two elements g to the power a, and g to the power b, where a and b are chosen randomly, no polynomial time adversary can distinguish g to the power a times b from a random element of the groups G1. A similar assumption is stipulated to hold for the group G2.

The protocol of FIG. 1 assumes that a fixed CRS 100 is known to all the peers. The protocol is symmetric and asynchronous with each party determining a message to be sent, receiving a corresponding message and determining a key. Therefore, the following description is from the perspective of one peer; the other is symmetric.

The CRS (see FIG. 5) includes three group elements g, A and K (301-303), chosen uniformly randomly from G; and a CRS for NIZK proofs (304).

Figure 2:
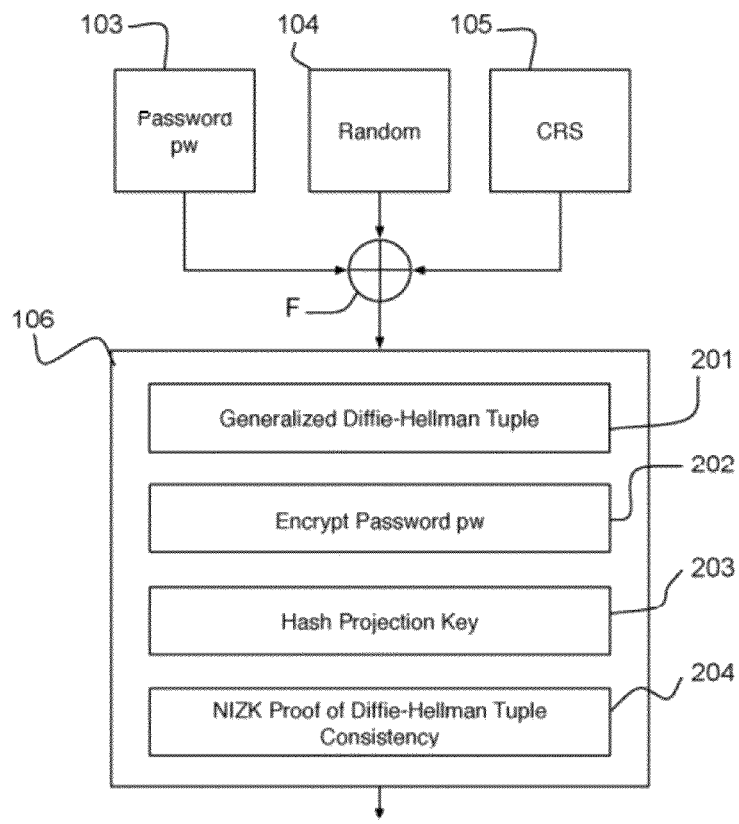
FIG. 2 is a diagram illustrating message generation according to an embodiment of the present disclosure.
Figure 6:
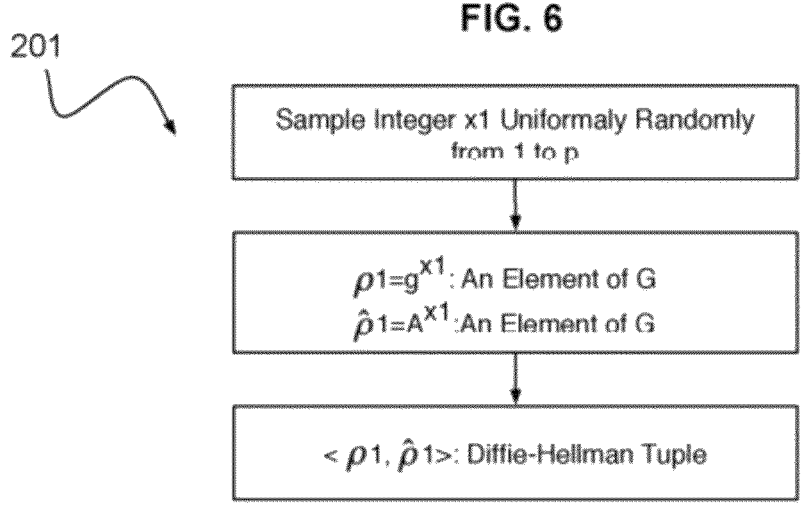
FIG. 6 is a diagram of a Diffie-Hellman Tuple according to an embodiment of the present disclosure.
Figure 7:
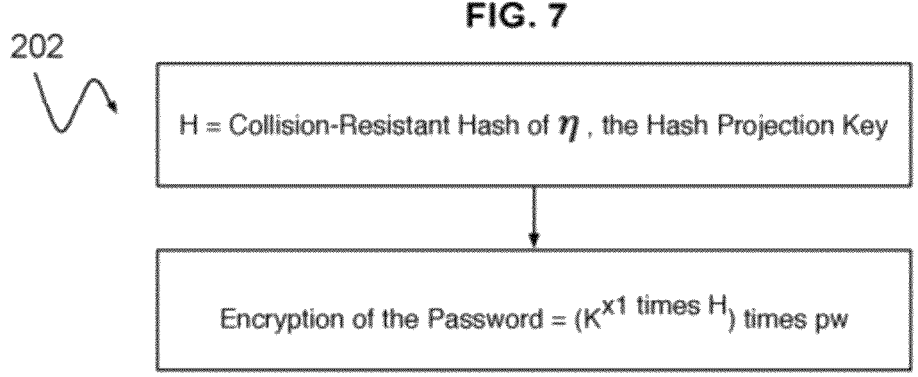
FIG. 7 is a diagram of an encrypted password according to an embodiment of the present disclosure.
Figure 8:
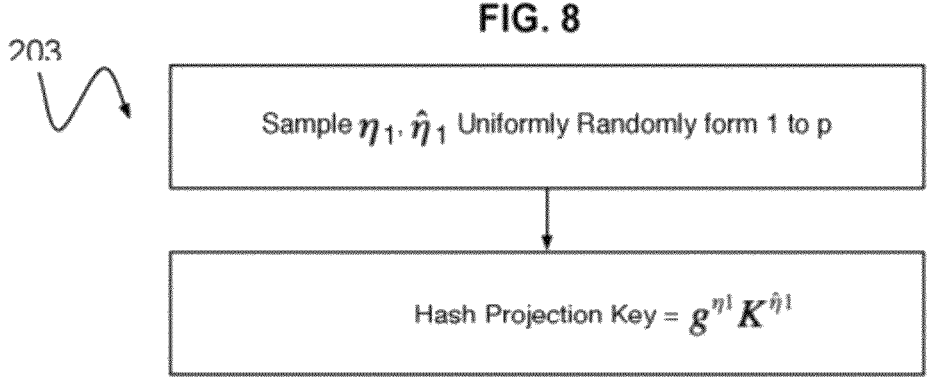
FIG. 8 is a diagram of a hash projection key according to an embodiment of the present disclosure.

Consider parties $P_i$ and $P_j$ involved in the protocol sharing a common password pw. In FIG. 2, party $P_i$ generates random numbers x, $\eta_1$ and $\eta_1'$ uniformly randomly from 1 to p and determines message components 106 including: a Diffie-Hellman Tuple: $=(g^x,A)$ (201 and FIG. 6), an encryption of the password: $=K^{x.ssid} \cdot pw$ (202, FIG. 7) (wherein ssid is a sub-session identification), a hash projection key: $g^{\eta_1} K^{\eta_1'}$ (203 and FIG. 8) and a NIZK proof of the existence of x such that the Diffie-Hellman Tuple in FIG. 6 is indeed of the form $(g^x, A^x)$ 204.

The NIZK proof of the Diffie-Hellman tuple consistency $\langle \rho_1, \rho_1' \rangle$ satisfies the following property:

There exists an x, such that $\rho_1 = gx$ and $\rho_1' = A^x$.

The NIZK proof may be constructed using known techniques. For example, a zero-knowledge protocol (e.g., a verifier learns no more from a proof than the truth of the statement) may be considered one-time simulation-sound if no polynomial-time adversary can prove a false statement even when given a transcript of a false statement being proven in the protocol by substituting an indistinguishable string by employing an underlying hardness assumption. This may be enabled by the bilinear pairing and the SXDH assumption. The proof is one-time simulation-sound such that in a one-time simulation sound zero-knowledge proof protocol, no adversary can modify a given proof of a statement to get a valid proof of another statement.

Consider that (NIZK [1, 2]) $\Pi = (l,P,V,S) = (S_1, S_2)$ may be a multi-theorem NIZK proof system (resp., argument) for the language $L \in NP$ with witness relation R if: l is a polynomial, and $P, V, S_1, S_2$ are all probabilistic poly-time machines such that there exists a negligible function α such that for all k:

Completeness: For all $x \in L$ of length k and all w such that R(x,w)=true, for all strings σ of length l(k), we have that V(x,P(x,w,σ),σ)=true.

Soundness: For all unbounded (resp., poly-time) adversaries A, if $\sigma \in \{0,1\}^{l(k)}$ is chosen randomly, then the probability that A(σ) will output (x,p) such that $x \notin L$ but V(x,p,σ)=true is less than α(k).

After determining the message components 106, $P_i$ sends out a single message including the message components over a communication channel (secure or insecure). This is shown in FIG. 1 as a strong key being sent out by $P_i$ (101*a*).

Figure 3:
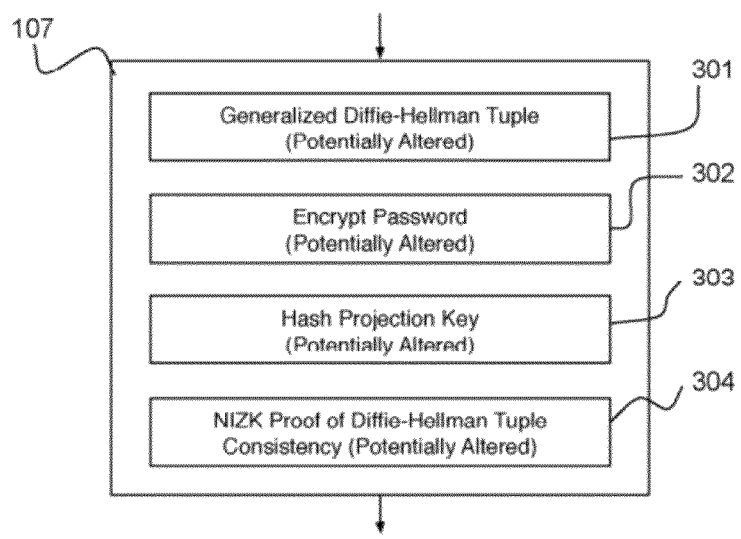
FIG. 3 is a diagram of a received message according to an embodiment of the present disclosure.

$P_i$ receives a key from the network, e.g., from $P_j$. Referring to FIG. 4, the received key (see 107, FIG. 3) is expected to have the same format as the message that was sent out by the peer $P_i$ (401). If the format is not syntactically well-formed or has the same Diffie-Hellman tuple as the message that was sent out by the peer $P_i$ (402), the protocol ends with a failure (403). Further, if the NIZK proof is not a valid proof of the consistency of the received Diffie-Hellman tuple (402), the protocol ends with failure (403). The received message, without the NIZK proof, may be denoted ($r_2, r'_2, e_2, \rho_2$).

FIG. 4 illustrates the generation of the strong key after the consistency checks are successful. Let CRH be a collision resistant hash function and let $H=CRH(\rho_2)$. Part 1 of the peer's key 404 may be determined as: $sk_1=(r'_2)^{n_1} \cdot (e_2/\rho w)^{(n_1'/H)}$. Part 2 of the peer's key 405 may be determined as: $sk_2=(\rho^2)^{x_1}$. The strong key 406 of the peer may be determined as: $sk=sk_1 \cdot sk_2$.

Techniques described herein can be used in more general cryptographic applications. An illustrative example is the case of a chosen-ciphertext attack resistant (CCA2) public key encryption scheme. A CCA2 public key encryption scheme includes public key and private key generation and distribution of the public key, encryption using that public key, and decryption using the private key. Such a CCA2 encryption scheme can be built using a chosen-plaintext attack resistant (CPA) encryption scheme and one-time simulation sound non-interactive zero-knowledge proofs as follows.

The encryption method generates a ciphertext which includes generating a generalized Diffie-Hellman tuple, an encryption of the message under the CPA encryption scheme, a labeled one-time simulation sound non-interactive zero-knowledge proof proving consistency of the generalized Diffie-Hellman tuple, where the label is the encrypted message under the CPA encryption scheme.

CPA is an example of a blinding encryption method, wherein a message may be encoded to substantially prevent a third party from knowing the content. According to an embodiment of the present disclosure, in the blinding encryption method, the message, e.g., the shared password, may be known to the peer.

According to an embodiment of the present disclosure, a Decisional Linear Assumption (DLIN) may be used to enable the NIZK proof. In the DLIN, a bilinear map is on two elements each from the same group G. More particularly, DLIN states that given a generator g for the cyclic group G of prime order p, and elements g to the power a, g to the power b, g to the power a times r, g to the power b times s, where a, b, r, and s are chosen randomly from 0 to p−1, then no polynomial time adversary can distinguish g to the power (r+s) from a random element of the group.

For purposes of using DUN, the generalized Diffie-Hellman tuple includes three elements $\langle U, V, W \rangle$, where U is of the form g to the power x, V is of the form A to the power y, and W is of the form B to the power x plus y. Here A and B may be pre-determined, e.g., being part of the Common Reference String.

Thus, the protocol may be described as follows: The common reference string (CRS) includes a plurality of elements from the cyclic group G of prime order p. These elements of the CRS are chosen randomly from the group, and can be named g, A, B, K1 and K2.

A first peer involved in a password based key exchange with a second peer, may generate a message to be sent to the peer as follows. The first peer picks a random integer x, and another random integer y, to generate a generalized Diffie-Hellman tuple as g to the power x, A to the power y, and B to the power x plus y. Here, exponentiations and product computations are done in the cyclic group G.

The first peer may generate two hash projections keys as follows. The first peer picks three random numbers l, m, and n. The first peer obtains the first hash projection key as a product of g exponentiated to the power l and K1 exponentiated to the power n. The first peer obtains the second hash projection key as a product of A exponentiated to the power m and K2 exponentiated to the power n.

The first peer encrypts the password by first exponentiating K1 to the power x, and K2 to the power y, and multiplies the two results together. The first peer may optionally exponentiate the resulting product to an additional power determined from the two hash projection keys determined earlier. For example, this determination may be done by applying a collision resistance function such as the Secure Hash Algorithm (SHA) to the pair of hash projection keys. It then multiplies the result with the product to obtain the encryption of the password. As before, all exponentiations and multiplications are done in the cyclic group G.

The first peer may determine the one-time simulation sound non-interactive zero knowledge proof to prove the consistency of the generalized Diffie-Hellman tuple, that is, to prove that the triple is of the form g to the power some integer x, A to the power another integer y, and B to the power x plus y.

The first peer may then send to the second peer the message including the generalized Diffie-Hellman tuple, the encryption the password, the pair of hash projection keys, and the zero-knowledge proof. Let the elements in the Diffie-Hellman tuple be named S, T, U. Further, the encryption is called E. The two has projection keys are respectively called R and F, and the zero-knowledge proof is called P.

The first peer saves in its local memory all the temporary variables, which it used to determine the outgoing message.

The first peer may receive a message from the second peer, which is purportedly of the same form it sent to the second peer. Let the elements received be called S', T', U', E', R', F' and P'.

The first peer proceeds as follow to determine the secret key, checking that the proof received P' is consistent with S', T', U' and the CRS. If the proof is invalid, the secret key is determined by randomly selecting an element from the group G.

If the proof is indeed valid, then the secret key may be determined as a product of two quantities H1 and H2 and H3. The quantity H1 is obtained as a product of R' exponentiated to the power l, and F' exponentiated to the power m. Recall, l, m, and n were chosen by the first peer to determine the hash projection keys R and F, and these values were saved in the local memory.

The quantity H2 may be obtained by first obtaining a quantity d as follows. The quantity d may be obtained by dividing n by a value determined from the received pair of hash projection keys R' and F'. This determination may be done in the same fashion as is done while determining the outgoing message element E. For example, d may be determined as n divided by SHA applied to the pair R' and F'. This particular division may be done modulo p, where p is the order of the group G.

The quantity H2 may be obtained by dividing E' by the password and exponentiating the result by d. As before all multiplications, division and exponentiations are done in the cyclic group G.

The quantity H3 may be obtained as the product of R' exponentiated to the power x, and F' exponentiated to the power y. Recall, x and y were used to obtain S and T in the outgoing message, and x and y were saved in local memory by the party.

As mentioned earlier, the secret key may be determined as the product of H1, H2 and H3 in the cyclic group G.

The methodologies of embodiments of the invention may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

The computer readable storage medium is non-transitory.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 9:
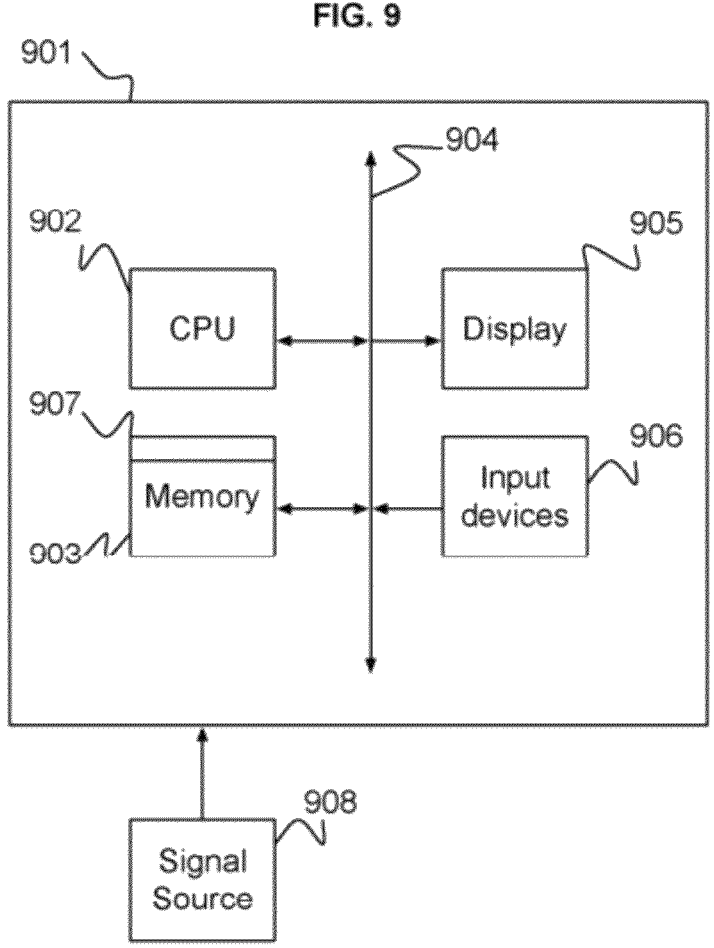
FIG. 9 is an exemplary system for executing a method according to an embodiment of the present disclosure.

For example, FIG. 9 is a block diagram depicting an exemplary system for single-round password-based key exchange enabling secure communications. The system 901 may include a processor 902, memory 903 coupled to the processor (e.g., via a bus 904 or alternative connection means), as well as input/output (I/O) circuitry 905-906 operative to interface with the processor 902. The processor 902 may be configured to perform one or more methodologies described in the present disclosure, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for initializing encrypted communications using a common reference string and a shared password comprising:
   determining a generalized Diffie-Hellman tuple;
   generating a one-time simulation-sound zero-knowledge proof proving a consistency of the generalized Diffie-Hellman tuple; and
   encrypting a message according to the generalized Diffie-Hellman tuple, the common reference string, and the shared password, wherein the method is performed by a processor,
   wherein the common reference string comprises elements g, A and K selected from a cyclic group G, and wherein the generalized Diffie-Hellman tuple comprises elements S and S' in the cyclic group G, the elements S and S' are obtained by picking a random integer x, and the element S is determined by exponentiating the element g to the power of the random integer x, and the element S' is obtained by exponentiating the element A to the power of the random integer x, and
   wherein the steps of determining, generating, and encrypting are performed using one or more computer systems.

2. A method for conducting encrypted communication using a common reference string and a shared password comprising: determining, using one or more computer systems, a secret key using a first message sent to a peer, a second message received from the peer and the common reference string, wherein the first message and the second message each comprise a generalized Diffie-Hellman tuple of elements of a cyclic group G of prime order p, a blinding encryption of the shared password, and a hash projection key,
   wherein the common reference string comprises elements g, A, B, K and K1 selected from the cyclic group G, and wherein the generalized Diffie-Hellman tuple comprises elements S, T, and U in the cyclic group G, the elements S, T, and U are obtained by picking random integers x and y, the element S is determined by exponentiating the element g to the power of the random integer x, the element T is determined by exponentiating the element A to the power of the random integer y, and the element U is determined by exponentiating the element B to the power of the random integer x plus the random integer y.

3. The method of claim 2, further comprising decoding by a processor a payload using a decoded form of the secret key.

4. The method of claim 2, further comprising encrypting a payload using a symmetric-key encryption scheme and the secret key.

5. The method of claim 2, wherein the first message and the second message each further comprise a one-time simulation-sound zero-knowledge proof.

6. The method of claim 5, further comprising proving consistency of the tuple by the processor according to a symmetric external Diffie-Hellman assumption.

7. The method of claim 5, further comprising proving consistency of the tuple by the processor according to a decisional linear assumption.

8. A computer program product for initializing encrypted communications using a common reference string and a shared password, the computer program product comprising: a computer readable storage medium having computer readable program code embodied therewith, the computer readable program code comprising:
   computer readable program code configured to determine a secret key of a peer using a first message, a second message and the common reference string, wherein the first message and the second message each comprise a generalized Diffie-Hellman tuple of elements of a cyclic group G of prime order p, a blinding encryption of the shared password, and a hash projection key,
   wherein the common reference string comprises elements g, A and K selected from the cyclic group G, and wherein the generalized Diffie-Hellman tuple comprises elements S and S' in the cyclic group G, the elements S and S' are obtained by picking a random integer x, and the element S is determined by exponentiating the element g to the power of the random integer x, and the element S' is obtained by exponentiating the element A to the power of the random integer x.

9. The computer program product of claim 8, wherein the first message and the second message each further comprise a one-time simulation-sound zero-knowledge proof.

10. The computer program product of claim 9, further comprising proving consistency of the tuple according to a symmetric external Diffie-Hellman assumption.

11. The computer program product of claim 9, further comprising proving consistency of the tuple according to a decisional linear assumption.

12. A computer program product for initializing encrypted communications using a common reference string and a shared password, the computer program product comprising: a computer readable storage medium having computer readable program code embodied therewith, the computer readable program code comprising:
   computer readable program code configured to send a first message to a peer;
   computer readable program code configured to receive a second message from the peer; and
   computer readable program code configured to determine a secret key of the peer using the first message, the second message and the common reference string, wherein the first message and the second message each comprise a generalized Diffie-Hellman tuple, a blinding encryption of the shared password, a hash projection key, and a one-time simulation-sound zero-knowledge proof proving consistency of the generalized Diffie-Hellman tuple,
   wherein the common reference string comprises elements g, A and K selected from a cyclic group G, and wherein the generalized Diffie-Hellman tuple comprises elements S and S' in the cyclic group G, the computer readable program code comprising: computer readable program code configured to obtain the elements S and S' by picking a random integer x, and determining the element S by exponentiating the element g to the power of the random integer x; and computer readable program code configured to obtain the element S' by exponentiating the element A to the power of the random integer x.

13. The computer program product of claim 12, further comprising computer readable program code configured to obtain the hash projection key by picking two or more random integers, and determining the hash projection key using the two or more random integers and the elements g, A and K.

14. The computer program product of claim 12, further comprising computer readable program code configured to obtain the encryption of the shared password by exponentiating the element K to the power of the random integer x and multiplying a result with the shared password in the cyclic group G.

15. The computer program product of claim 12, further comprising computer readable program code configured to obtain the encryption of the shared password by exponentiating the element K to the power of the random integer x, and exponentiating by a function determined from the hash projection key and a pre-determined protocol session identifier, and multiplying a result with the shared password in the cyclic group G.

16. A computer program product for initializing encrypted communications using a common reference string and a shared password, the computer program product comprising: a computer readable storage medium having computer readable program code embodied therewith, the computer readable program code comprising:
  computer readable program code configured to send a first message to a peer;
  computer readable program code configured to receive a second message from the peer; and
  computer readable program code configured to determine a secret key of the peer using the first message, the second message and the common reference string, wherein the first message and the second message each comprise a generalized Diffie-Hellman tuple, a blinding encryption of the shared password, a hash projection key, and a one-time simulation-sound zero-knowledge proof proving consistency of the generalized Diffie-Hellman tuple, wherein the common reference string comprises elements g, A, B, K and K1 selected from a cyclic group G, and wherein the generalized Diffie-Hellman tuple comprises elements S, T and U in the cyclic group G, the computer readable program code comprising:
  comprising computer readable program code configured to obtain the elements S, T, and U by picking random integers x and y, comprising, determining the element S by exponentiating the g to a power of the random integer x, determining the element T by exponentiating the element A to a power of the random integer y, and determining the element U by exponentiating the element B to a power of the random integer x plus the random integer y.

17. The computer program product of claim 16, further comprising computer readable program code configured to obtain the hash projection key using the random integers x and y in the cyclic group G and the elements g, A, B, K1, and K2.

18. The computer program product of claim 16, further comprising computer readable program code configured to obtain the encryption of the shared password is obtained by exponentiating the element K1 to a power of the random integer x, and exponentiating the element K2 to a power of the random integer y, multiplying the random integers x and y, and multiplying a result with the shared password.

19. The computer program product of claim 16, further comprising computer readable program code configured to obtain the encryption of the shared password by exponentiating the element K1 to a power of the random integer x, and exponentiating the element K2 to a power of the random integer y, multiplying the random integers x and y, raising a result to a power of a function determined from the hash projection key, and multiplying a result with the shared password.

* * * * *